No. 822,898. PATENTED JUNE 5, 1906.
E. R. MALMBORG.
AUTOMATIC MARKING AND CANCELING MACHINE.
APPLICATION FILED SEPT. 2, 1903.

Witnesses:
W. B. Martindale
C. E. Jordan

Ernst R. Malmborg Inventor.
By his Attorney David W. Fletcher

No. 822,898. PATENTED JUNE 5, 1906.
E. R. MALMBORG.
AUTOMATIC MARKING AND CANCELING MACHINE.
APPLICATION FILED SEPT. 2, 1903.
11 SHEETS—SHEET 3.

Fig. 3.

Witnesses:
W. B. Martindale
C. E. Jordan

Ernest R. Malmborg, Inventor,
By his Attorney David H. Fletcher

No. 822,898. PATENTED JUNE 5, 1906.
E. R. MALMBORG.
AUTOMATIC MARKING AND CANCELING MACHINE.
APPLICATION FILED SEPT. 2, 1903.
11 SHEETS—SHEET 4.

Fig. 4.

Witnesses:
W. B. Martindale
C. E. Jordan

Ernst R. Malmborg, Inventor.
By his Attorney David H. Fletcher.

No. 822,898. PATENTED JUNE 5, 1906.
E. R. MALMBORG.
AUTOMATIC MARKING AND CANCELING MACHINE.
APPLICATION FILED SEPT. 2, 1903.

Witnesses:
W. B. Martindale
C. E. Jordan

Ernst R. Malmborg Inventor,
By his Attorney, David N. Fletcher.

No. 822,898. PATENTED JUNE 5, 1906.
E. R. MALMBORG.
AUTOMATIC MARKING AND CANCELING MACHINE.
APPLICATION FILED SEPT. 2, 1903.

No. 822,898. PATENTED JUNE 5, 1906.
E. R. MALMBORG.
AUTOMATIC MARKING AND CANCELING MACHINE.
APPLICATION FILED SEPT. 2, 1903.

Witnesses:
W. B. Martindale
C. E. Jordan

Ernst R. Malmborg Inventor
By his Attorney, David H. Fletcher.

No. 822,898. PATENTED JUNE 5, 1906.
E. R. MALMBORG.
AUTOMATIC MARKING AND CANCELING MACHINE.
APPLICATION FILED SEPT. 2, 1903.

Witnesses:
W. A. Martindale
C. E. Jordan

Ernest R. Malmborg, Inventor
By his Attorney David W. Fletcher.

No. 822,898. PATENTED JUNE 5, 1906.
E. R. MALMBORG.
AUTOMATIC MARKING AND CANCELING MACHINE.
APPLICATION FILED SEPT. 2, 1903.

UNITED STATES PATENT OFFICE.

ERNST R. MALMBORG, OF CHICAGO, ILLINOIS, ASSIGNOR, BY MESNE ASSIGNMENTS, TO TIME MARKING MACHINE COMPANY, A CORPORATION OF THE DISTRICT OF COLUMBIA.

AUTOMATIC MARKING AND CANCELING MACHINE.

No. 822,898.   Specification of Letters Patent.   Patented June 5, 1906.

Application filed September 2, 1903. Serial No. 171,589.

*To all whom it may concern:*

Be it known that I, ERNST R. MALMBORG, of Chicago, in the county of Cook and State of Illinois, have invented certain new and useful Improvements in Automatic Marking and Canceling Machines, of which the following is a full, clear, and exact description, reference being had to the accompanying drawings, forming a part of this specification, in which corresponding numerals of reference in the different figures indicate like parts.

My invention relates more especially to machines for marking mail-matter, but may be readily applied to the cancellation of checks and drafts, as well as to use in connection with card systems or wherever it becomes necessary to mark cards or other memoranda with a date, including the exact hour and minute.

To these ends my invention consists in the combination of elments hereinafter more particularly described, and definitely pointed out in the claims.

In the drawings,
Figure 1 is a front elevation of my improved machine.

Figure 4:
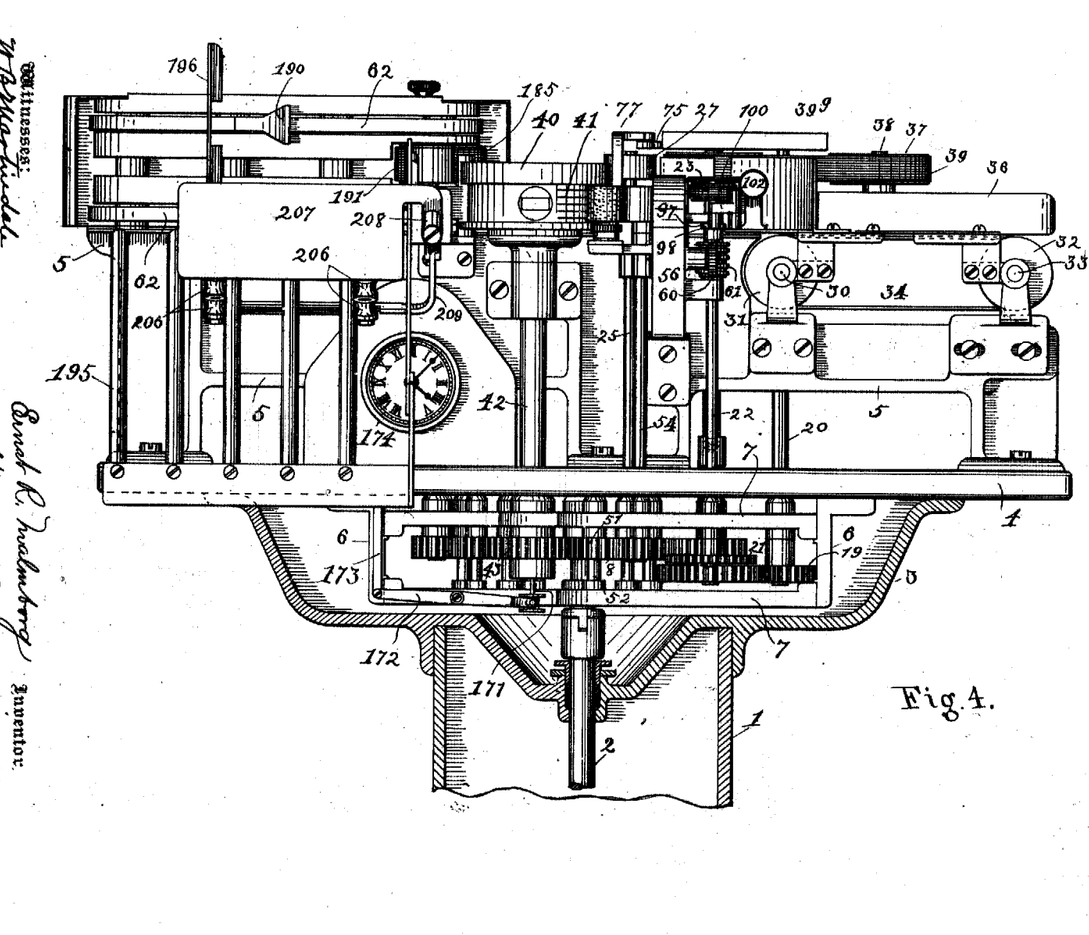
Fig. 4 is an enlarged front elevation, partly in section, of the main or upper portion of the machine.
Figure 5:
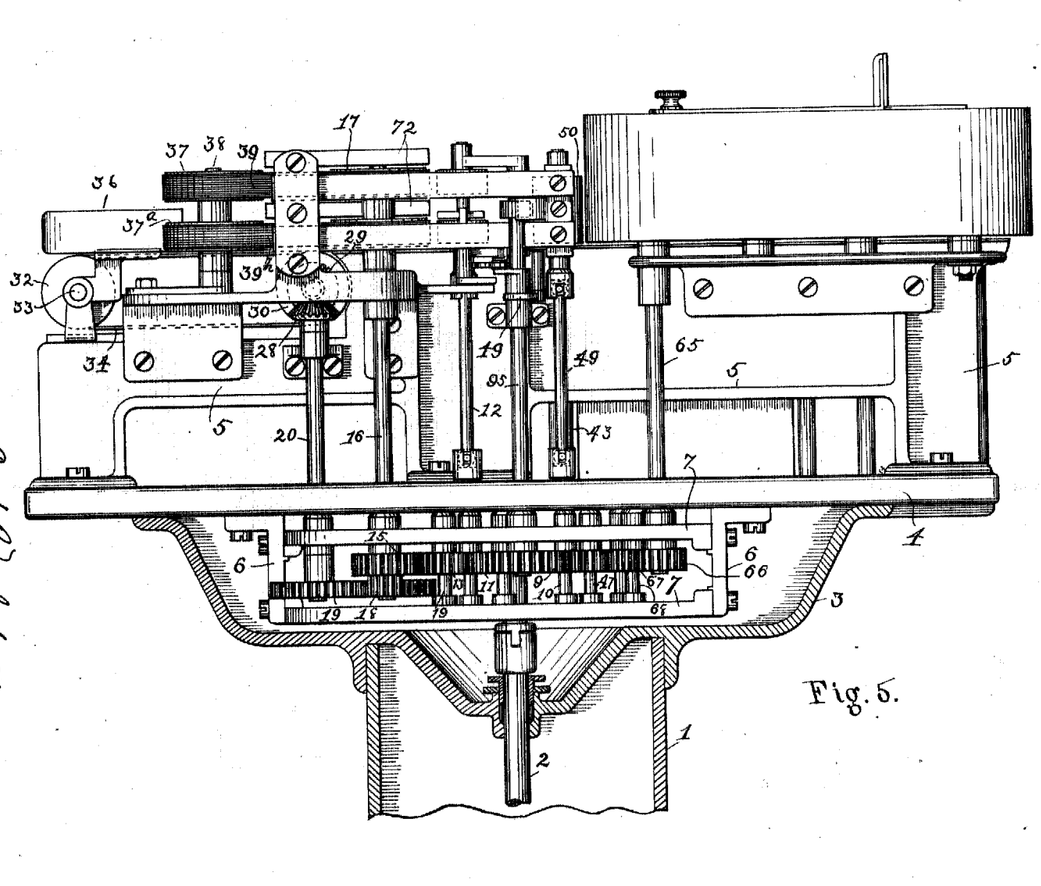
Fig. 5 is a rear elevation of that part of the machine shown in Fig. 4, a portion of the supporting-frame being in section.
Figure 6:
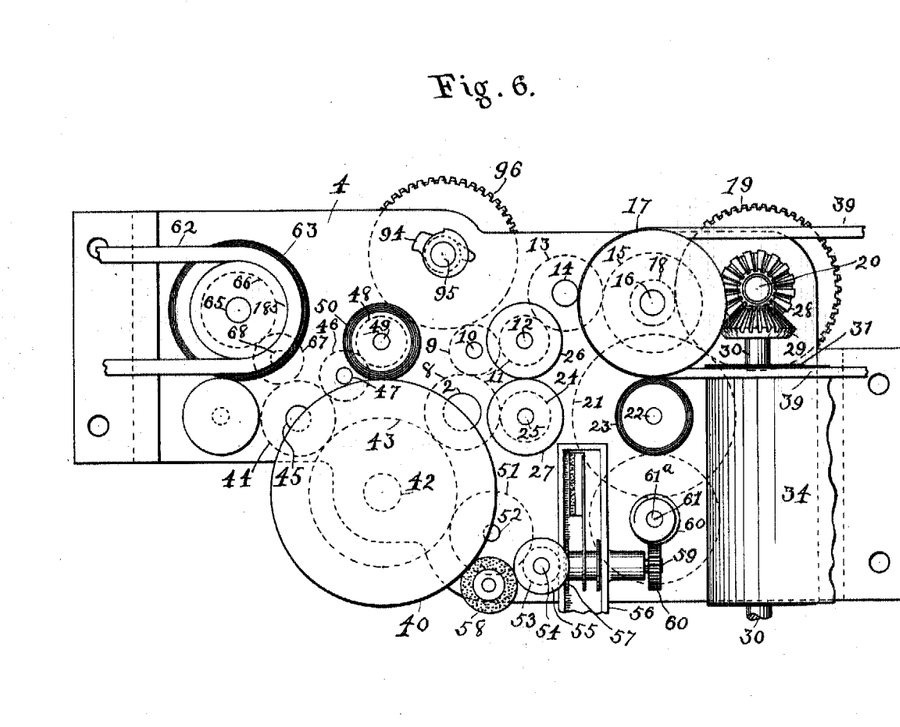
Fig. 6 is a plan view with the vertical frame portion and other parts removed to show the relative location of the driving-gears, feed and printing rolls, and other parts, said gears being generally shown in dotted lines.

Referring to the drawings, 1, Figs. 1, 2, 4, and 5, represents the lower supporting-frame of the machine, which consists of a case inclosing a rheostat and any well-known form of electric motor (not shown) in operative connection with a main vertical driving-shaft 2, Figs. 4, 5, and 6. Above the part 1 is superposed a cup-shaped part 3, which performs the double function of an oil-receptacle and a support for a main horizontal plate 4, which supports a longitudinal vertical frame-plate 5. (Shown in the principal figures.) Screwed to the bottom of the plate 4 are depending brackets 6 6, Figs. 4 and 5, which serve as supports for two horizontal plates 7 7, the latter being adapted to form bearings for a series of vertical shafts having a train of gears mounted thereon, as shown. This construction enables the shafts and gears to run in oil contained within the receptacle 3.

The mechanisms embodied in my improvement are for feeding, printing, registering, and assembling or stacking the articles marked or canceled, and they will be considered, respectively, in the order enumerated, reference being had first more especially to the driving parts, the relations of which are best shown in Fig. 6, in which the pitch-lines of the several gears are indicated in dotted lines.

Upon the main driving-shaft 2 is mounted a gear 8, which meshes into a gear 9 upon a shaft 10. The gear 9 in turn engages a gear 11 upon a shaft 12. The gear 11 engages a gear 13 upon a stud 14, which latter gear in turn meshes into a gear 15 upon a shaft 16. Upon the latter shaft is mounted the main or driving pulley 17, hereinafter referred to. Upon the shaft 16 is mounted a pinion 18, which engages a spur-gear 19 upon a shaft 20. Said spur-gear engages a like gear 21 upon a shaft 22. Upon the upper end of the latter shaft, in the same plane with the feed-pulley 17, is mounted a friction-roll 23, having a face of rubber or other similar material adapted to form a frictional surface. The main driving-gear 8 upon the shaft 2 also engages a gear 24 upon a shaft 25, which is adapted to run at the same rate of speed as the shaft 12. Upon the shafts 12 and 25, respectively, are mounted secondary or supplemental timing feed-rolls 26 27. A beveled pinion 28, Figs. 3 and 6, upon the shaft 20 is arranged to engage a like pinion 29 upon a horizontal shaft 30, upon which is mounted a drum 31, which is supplemented by a drum 32 upon a shaft 33, Figs. 3 and 4. A wide feed-belt 34 is mounted upon the drums 31 32 and is adapted to serve as a moving platform, upon which to place the matter to be fed to the machine. The margins of said feed-belts are protected by means of stationary sheet-metal guards 35 36 in Figs. 3, 4, and 5.

Figure 3:
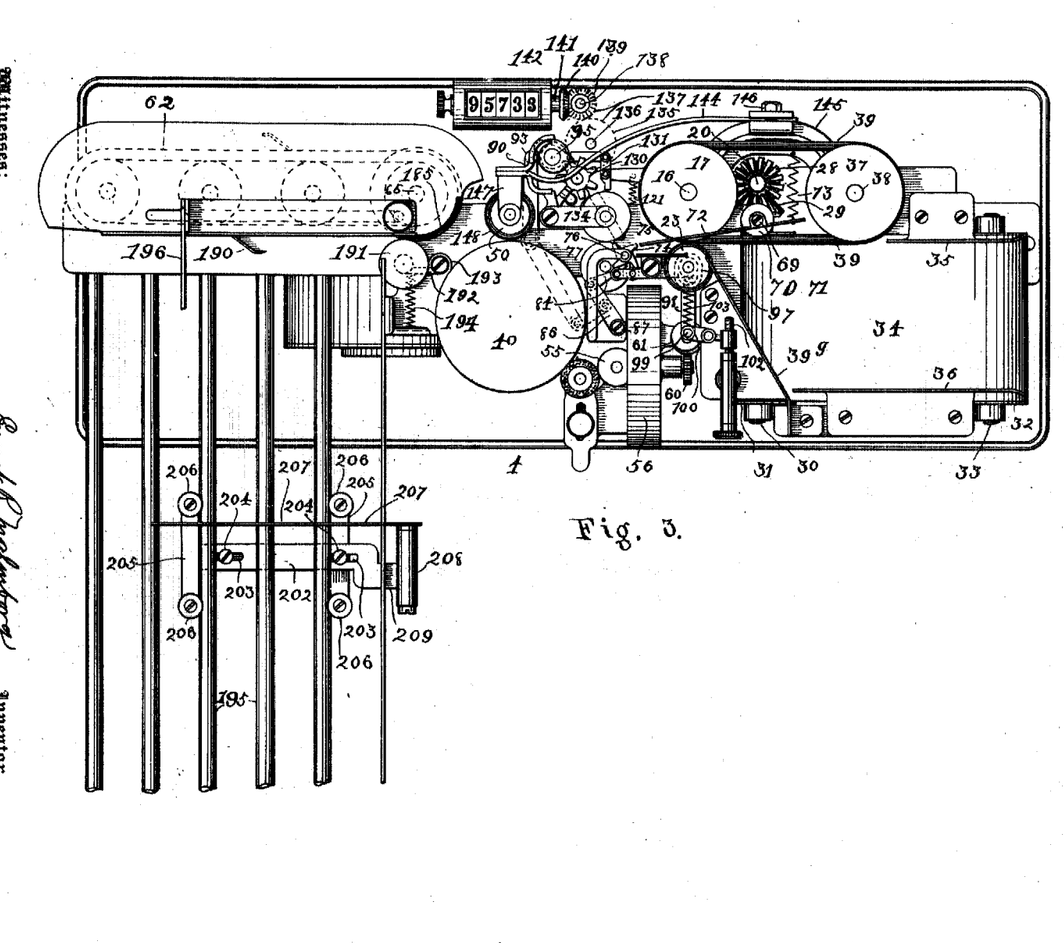
Fig. 3 is a plan view.

The pulley 17, Figs. 3 and 6, is connected with a like pulley 37, Figs. 3, 4, 5, 15, and 16, mounted upon a vertical shaft 38, and is driven by means of a belt 39 connecting with the driving-pulley 17. Like pulleys 17ª and 37ª are located immediately below upon corresponding shafts and are connected by a like belt 39ʰ. The inner face of the belts 39 and 39ʰ are in a vertical plane at right angles to and above the plane of the web or belt 34.

The foregoing is a general description of the gears, pulleys, and belts which constitute the main features of the feed mechanism and which will be hereinafter more particularly referred to in connection with the automatic controlling devices.

Figure 1:
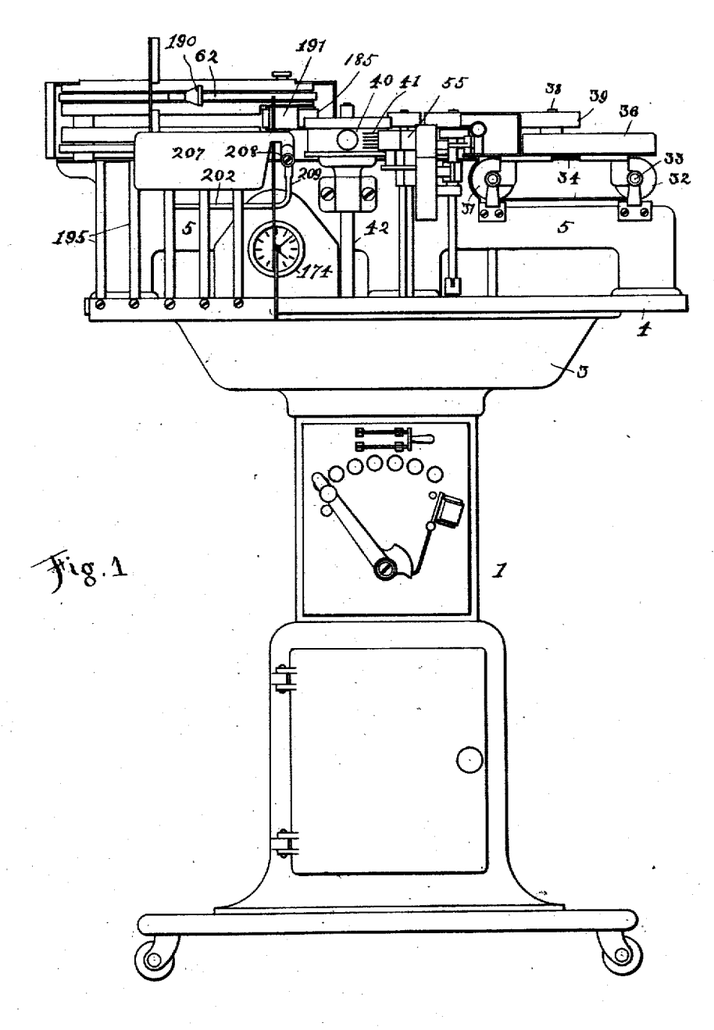

The printing-wheel 40, having the requisite marking characters 41, Figs. 1 and 4, upon its periphery, is mounted upon a vertical shaft 42, upon which is secured a gear 43, which meshes into and is driven by the gear 8 of the driving-shaft 2. The gear 43 is in engagement with a gear 44 upon a stud 45, the latter gear meshing in turn with a gear 46 upon a stud 47 and that in turn with a gear 48 upon a shaft 49, upon which latter shaft is mounted a compression-roller 50, having a frictional surface of rubber or other analogous material, and adapted at the proper interval of time, as hereinafter explained, to press the article to be marked against the printing-surface. The gears described bear such relations to each other as to cause the peripheral speed of the wheels 40 and 50 to be the same.

For the purpose of inking the printing-surface the following described mechanism is provided: The gear 43 upon the printing-wheel shaft is arranged to mesh with a gear 51 upon a stud 52. This in turn drives a gear 53 upon a shaft 54, upon which is mounted a roller 55, adjacent to an ink-well 56, in which is located a disk 57, Fig. 6, arranged to contact with the face of the roller 55, the rotation of the part 57 serving to lift the ink into contact with and to distribute it upon said disk. An ink-roller 58, faced with the usual absorbent material, is interposed between the roller 53 and the printing-roll 40 and in operative contact with both. The ink-feeding disk 57 is driven by means of a shaft 59, upon which it is mounted, which shaft extends through the wall of the ink-well and is provided with a worm-gear 60 upon its outer end. The latter is in engagement with a worm 61 upon a shaft 61ª, which latter is provided with a pinion arranged to be driven by the gear 21.

The foregoing completes the description of the printing mechanism, with the exception of the means for controlling the compression-roller 50 to prevent it from becoming inked, and also the time-printing and stacking mechanism, which will be hereinafter described.

The letters or other articles to be marked are fed between the rolls 17 and 23, Figs. 3, 7, and 8, and after having been acted upon by automatic retarding or synchronizing mechanism, hereinafter described, are passed between the rolls 26 27, where they serve to bring into action certain registering mechanism, likewise the subject of future description, when they are passed between the printing and compression rolls and thence to the stacking mechanism. The primary feature of the latter consists, preferably, of sprocket-chains 62 62, mounted upon sprocket-wheels 63 64, the former of which constitute the driving-wheel and is keyed to a shaft 65, having a gear 66 thereon in mesh with a gear 67 upon a stud 68. The latter gear is in turn driven by means of a gear 44. A further description of the stacking mechanism will be deferred to follow a detailed description of the automatic synchronizing and registering devices connected with the feed mechanism and the special timing feature arranged to coact with the printing-die.

Mounted upon a stud 69, Fig. 3, are idle rollers 70, adapted to serve as a bearing for the middle portion of the feed-belts 39 39ʰ. (Shown also in Fig. 5.) Pivoted upon said stud by means of ears 71, one of which is shown in Fig. 3, are deflecting-plates 72, Figs. 3 and 5. The forward ends of said plates lie inside of the plane of the belts, as shown, and are connected, by means of a coiled spring 73, to a stationary point, while the free ends project between said belts and extend beyond the periphery of the belt-pulley 17, where they are normally but yieldingly held into close proximity to fingers 74 upon a synchronizing wheel, (generally designated as 75 and shown in full size in Figs. 7 and 8.) Said synchronizing wheel is pivoted upon a stud 76, depending from a bridge-plate 77, rigidly attached to the frame. One face of each of the four teeth of said wheel is disposed tangentially to a circle con centric with its axis, the inner face of each tooth (said face lying in a radial line) being in substantial alinement with the plates 72, so that a letter passing between the belts 39 39$^h$ and roller 23 will be deflected by the deflecting-plates 72 against the inner or radial face of the tooth 74, thereby causing the letter to be brought momentarily into contact with and for an instant to be retarded in its movement by such contact with the hub of said wheel. The wheel 75 is held normally in the position shown in Figs. 3, 7, and 8 by means of an arm 78, having friction-rollers 79 80 thereon, said arm being pivoted at 81 to a lug 82. A coiled spring 83 serves to press said rollers against the teeth of the wheel with a yielding pressure. The wheel 75 is provided with a lantern-pinion having four teeth, (indicated in dotted lines in Figs. 7 and 8,) which teeth are adapted to be engaged by a pawl 84, pivotally attached at 85 to the end of an arm 86, pivoted to a stud 87 at a stationary point on the frame. A spring 88 serves to hold the pawl 84, which is notched or bifurcated at its free end, into contact with the teeth of said lantern-pinion. A link 89 serves to connect the arm 86 with one end of a bent lever 90, which is pivoted to the frame 91, said lever being held in a normal position by means of a coiled spring 92. (Indicated in dotted lines.) Upon the free end of said lever is a friction-roller 93, which is adapted to be engaged by a cam 94, mounted upon a shaft 95. Said shaft is driven by means of a gear 96 thereon, Fig. 6, which gear is in turn driven by means of the gear 9. With each revolution of the shaft 95 the lever 90 is vibrated, thereby communicating its motion through the link 89, arm 86, and pawl 84 to the lantern-pinion of the wheel 75, which serves to impart a step-by-step revoluble motion to said wheel from right to left in unison with the rotation of the printing-die. This causes the tooth of said wheel which points toward the guard 72 to move a quarter of a revolution and to lie just within the margin of the periphery of the roller 27. In making this movement the letter or card, which is described as having rested against said hub, is pushed laterally by the next succeeding tooth against the plate 72, which causes the latter to yield, thus enabling said letter to be introduced between the rollers 26 27. Inasmuch as the rotation of the synchronizing wheel 75 is accomplished as a result of the rotation of the shaft 95, which is in positive connection through a train of gears with the driving-shaft, it follows that the letter or other article to be marked can only be brought into contact with the feed-rolls 26 27 at a stated interval of time, which bears a fixed relation to the position of the printing-die upon the roller 40, thereby causing the impression upon the article to be marked to be made in the proper place.

In feeding to the machine the matter to be marked the retarding-roller 23 performs an important function. Said roller being provided with a friction-surface, as stated, is driven in an opposite direction from that of the feed-roll 17 at a lesser rate of speed and is mounted in yielding bearings formed by means of a yoke 97 (indicated in dotted lines in Figs. 3, 4, 7, and 8) upon the end of an arm 98, which is connected at 99 to one end of an adjustable lever 100, pivoted upon a stationary stud 101. An adjusting-screw 102, swiveled in a stationary bearing and connected with the opposite end of said lever, enables said yoke to be accurately adjusted. A light compression-spring 103 serves to press the shaft upon which said roller is mounted against the inner end of the yoke and to hold said yoke with a slight yielding pressure in close proximity to the belts 39 and 39$^h$, so as to insure the passage of but one letter or other article at a time.

I will now explain the mechanism for registering the pieces to be marked as they are passed successively through the machine and also for causing the impression-roller to act at the proper time during the rotation in operative proximity thereto of the printing-die and to be withheld from so acting when no letter is passing.

Figure 7:
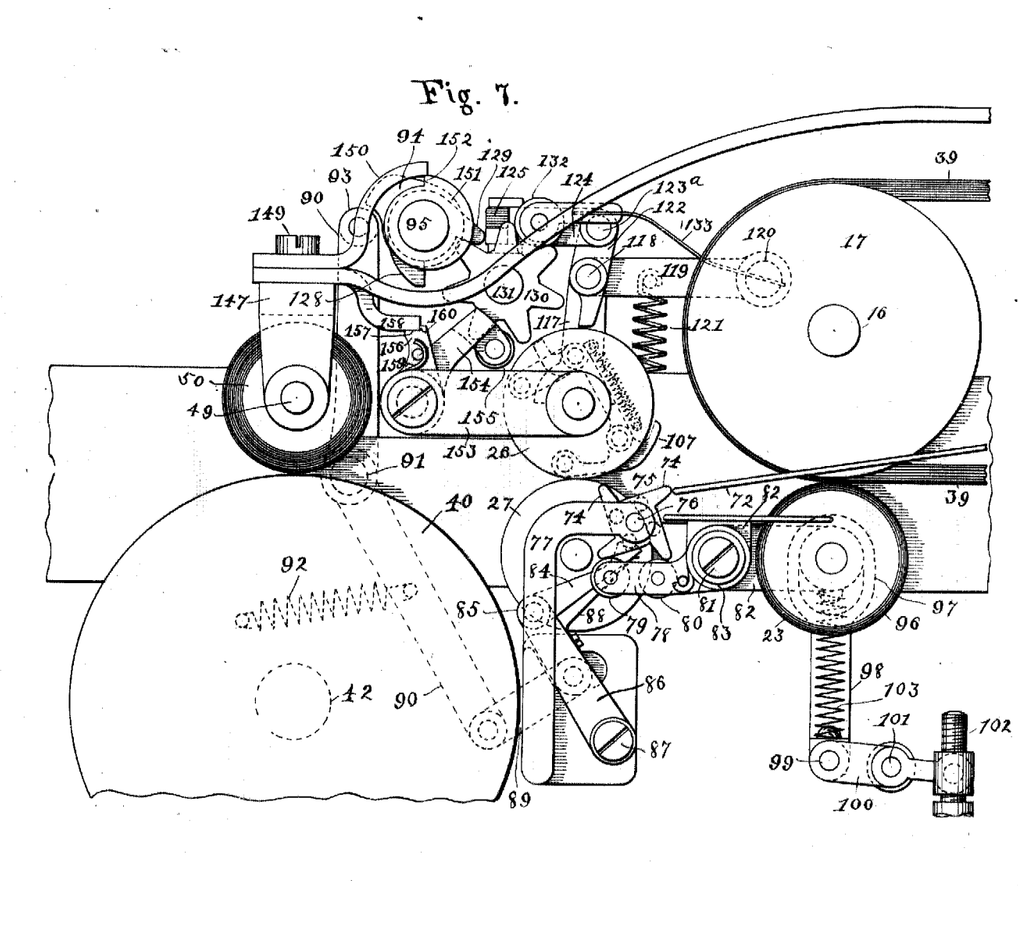
Fig. 7 is a plan view in detail of a portion of the feed and registering mechanism, the parts being shown in full size.
Figure 8:
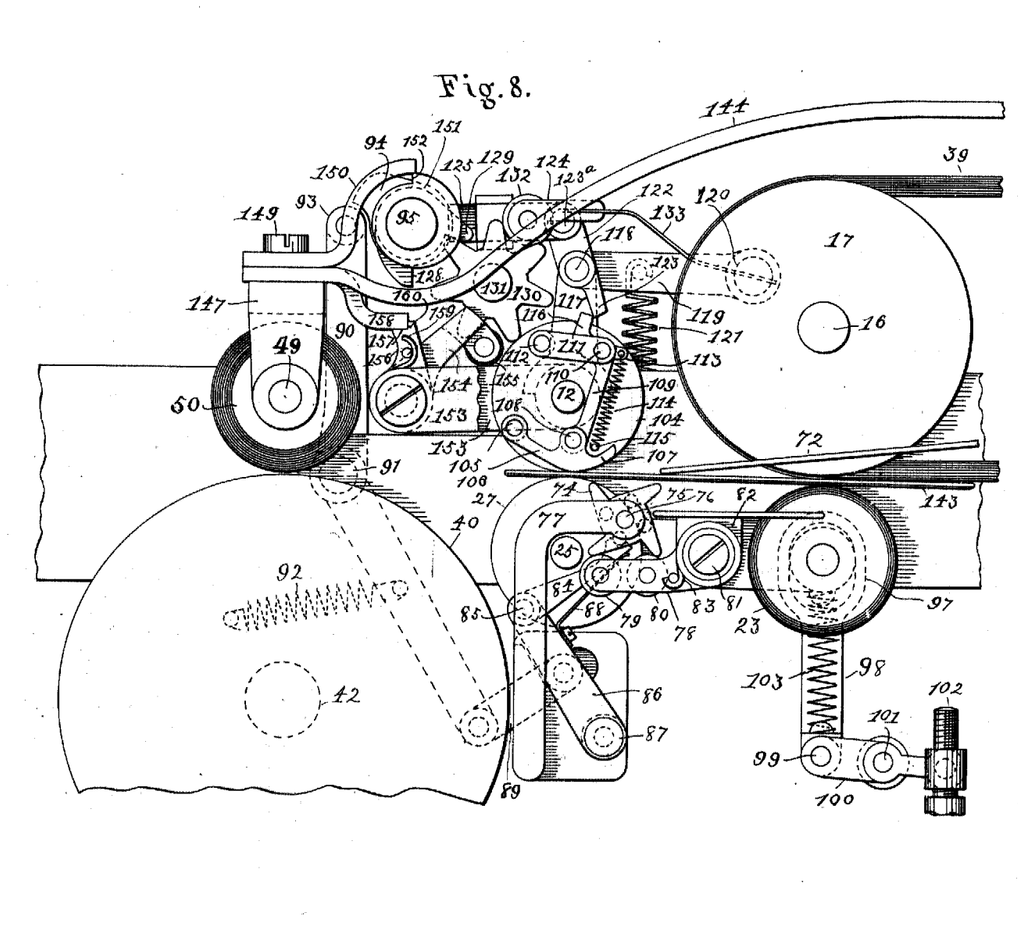
Fig. 8 is a like view showing the parts in different relative positions, one of the upper feed-rolls being removed to show the mechanism immediately below it.
Figure 9:
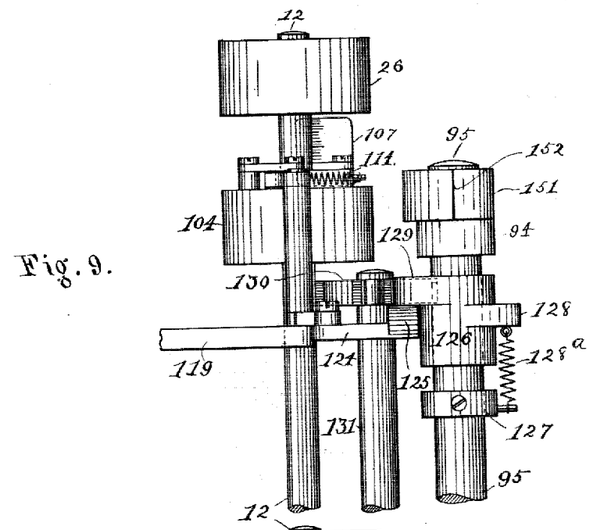
Fig. 9 is an enlarged view in detail of said registering mechanism as shown from the rear.
Figure 10:
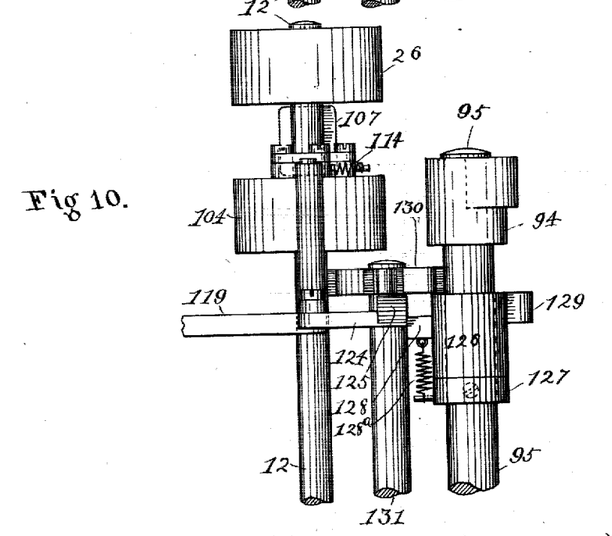
Fig. 10 is a like view showing the parts in reversed positions.

Upon the shaft 12 and supplementary to the feed-roll 26 referred to is mounted a secondary feed-roll 104, Figs. 8 to 10, inclusive, of corresponding diameter. Pivoted at 105, Fig. 8, upon the upper face of the roll 104 is a lever-arm 106, the free end of which is bent to conform substantially to the curve of the periphery of said roll, as shown at 107. (See also Figs. 9 and 10.) Pivotally connected at 108 to said lever-arm is a secondary lever-arm 109, which is in like manner connected at 110 to the free end of a link 111, the opposite end of which is pivotally attached at 112 to the face of said feed-roll. A lug 113 upon the lever-arm 109 is connected, by means of a coiled spring 114, to a pin 115 upon said roll. From the pivotal point 110 the lever-arm 109 is bent, as shown at 116, and is of such a length that when in a normal position, in which it is held by the spring 114, its outer end is within or substantially flush with the periphery of the roll. The action of the spring is such as to cause the part 107 to normally project beyond the periphery of the feed-rolls, as clearly shown in Fig. 7, for the purpose hereinafter stated. The shaft 12 is jointed at or near its lower end, and the upper end is free to yield laterally, so as to allow the feed-rolls 26 and 104 to move away from the corresponding rolls upon the shaft 25, thereby permitting the passage between the opposite feed-rolls of articles of varying thickness. This is accomplished by the following means: A yoke 117, the fork of which is indicated in dotted lines in Figs. 7 and 8, has its fork resting against the shaft-bearing, while its opposite end is pivoted at 118 to the free end of an arm 119, the opposite end of which is pivotally connected to the frame by means of a stud, as indicated in dotted lines at 120. A coiled spring 121 serves to connect said arm with a stationary point on the frame, thereby serving, through the action of said yoke, to press said feed-rolls together with a yielding pressure. Supported upon the pivot 118 is a short lever 122, the free end 123 of which is in immediate proximity to the periphery of the roll 104 and in the same horizontal plane with the end 116 of the lever 109. The opposite end of the lever 122 is pivoted at 123ª to a slide-bar 124, Figs. 7 to 10, inclusive, which is supported in a suitable bearing and is provided upon its opposite end with a cam 125. Upon the shaft 95 is mounted a sleeve 126, Figs. 9 and 10, which is splined to said shaft, so as to rotate therewith, but free to be moved vertically. A collar 127, rigidly attached to said shaft, serves as a rest and support therefor. A cam 128, formed upon said sleeve, is connected, by means of a coiled spring 128ª, with a pin upon said collar, the object of said spring being to normally hold said sleeve against the collar. A secondary cam 129 is formed upon the sleeve 126 and is adapted when the cam 125 is in the position shown in Figs. 8 and 9 to engage the latter and ride upwardly thereon, so as to engage with the teeth of a star-wheel 130 upon the upper end of a shaft 131. Said star-wheel is maintained in a normal position by means of a roller 132 upon the free end of a spring 133, Figs. 7 and 8, which spring is attached to the frame. The shaft 131 is provided with a pinion 134 upon its lower end, (shown in dotted lines in Fig. 3,) which pinion meshes into a gear 135 upon a shaft 136. This in turn engages a gear 137 upon a shaft 138, having a beveled gear 139 upon its upper end arranged to drive a like gear 140 upon a horizontal shaft 141, connected with and arranged to actuate any well-known form of registering mechanism 142. The operation of said registering mechanism in conjunction with that of the feed mechanism is as follows: As stated, the part 107 of the lever 106 normally projects outwardly beyond the peripheral line of the rolls 26 and 104. The result is that when a letter 143, Fig. 8, reaches the feed-rolls the part 107 is pressed back thereby against the action of the spring 114, which action causes the part 116 of the lever 109 to protrude sufficiently, as shown in Fig. 8, to engage the end of the lever 122 and move it to an extreme position, thereby actuating the slide 124 and moving the cam 125 into position to engage the cam 129, which latter is lifted thereby as the shaft 95 is rotated, thus bringing said cam momentarily into the same plane with the star-wheel 130, which wheel is operated by said cam and moved a distance of one notch, when the cam 129 rides off from the cam 125 and the sleeve 126 is drawn down by the spring 129 to its normal position upon the collar 127. As the shaft 95 continues its rotation the cam 128 is brought into contact with the end of the slide-bar 124, as shown in Figs. 7 and 10, thereby moving it back to its normal position ready to be again moved into position to engage the cam 129 whenever a letter passes between the feed-rolls. The cam 94, which, as heretofore stated, controls the action of the synchronizing wheel 75, is so timed as to release the letter from said synchronizing wheel into contact with the feed-rolls 26 27 when the part 107 is in substantially the position shown in Fig. 7, so that it will be actuated thereby.

Having described the registering mechanism, I will now proceed to explain the devices for controlling the action of the compression-roll in conjunction with the printing-die.

A long horizontally-arranged flat spring 144, Figs. 3, 7, and 8, is adjustably attached to a frame-piece 145, Fig. 3, by means of a clamping-nut 146. Upon the free end of said spring is attached a yoke-like frame 147, connected with the shaft 49, upon which the compression-roller 50 is mounted. Said roller is faced with rubber or other suitable material, as shown, and is adapted to be pressed by the spring 144 against the face of the printing-wheel 40; but in order to prevent said compression-roller from becoming inked, and thereby soiling the letters or other articles to be marked, it is essential that said roller should be normally held away from said printing-wheel and that it should only be freed during the passage between it and the printing-wheel of the article to be marked, so that in practice it shall never be brought into contact with any portion of said wheel, but only with said article. Attached to the frame 147, by means of a screw 149, is a curved arm 150, which is fitted to rest normally against a cam 151 upon the shaft 95, said cam having a shoulder 152. When the cam is rotated to a position to permit the part 150 to ride off from the shoulder, the compression-wheel is free to be pressed against the face of the printing-wheel, provided it is not prevented from so doing by the action of intervening mechanism. It is necessary, however, that such release should not occur with each revolution of the cam 151, but only, as stated, during the passage of a letter. For this reason the release of the compression-wheel is controlled by the action of the star-wheel 130. Pivotally mounted between two parallel plates 153 153, Figs. 7 and 8, is a sleeve having an arm 154 beneath and to a fitting upon the end of which is mounted a friction-roller 155 in position to be engaged by the teeth of said star-wheel. A secondary arm 156, which is integral with or rigidly attached to said sleeve, is provided with a shoulder 157, adapted to serve normally as a rest for a bent arm 158, which is rigidly attached to the wheel-frame 147. A coiled spring 159 tends to move the arm 156 toward the part 158, a lug 160 serving to limit said movement. As a result of a partial rotation of the star-wheel through the action of the cam 129 the shoulder 157 is withdrawn from against the part 158, and the cam 151 being timed with reference to this action the part 150 rides off from the shoulder 152 of the cam 151, when the roller 50 acts to compress the article to be marked against the printing-die. As soon as the compression is completed the compression-roller is withdrawn by the action of the cam 151, and when moved back to its normal position the part 157 is moved beneath the part 158, thereby withholding the compression-roller until it is again automatically released as a result of the passage of a letter.

The shaft of the printing-wheel and the shaft 95 run at the same rate of speed, and the cam 151 is so timed as to permit the compression-roll to act only during such time as is necessary for the printing-die to pass it. The distance between the secondary feed-rollers and the compression-roller is such as to provide for the shortest letter, while the circumference of the printing-wheel is equal to the length of the longest. It follows, therefore, that but one registration can occur and but one impression can be made and that in the proper place, whether the letters be long or short, provided they are within the limits of ordinary usage.

The printing mechanism contained within the printing-wheel is provided with certain novel features, which I will now proceed to describe.

Figure 11:
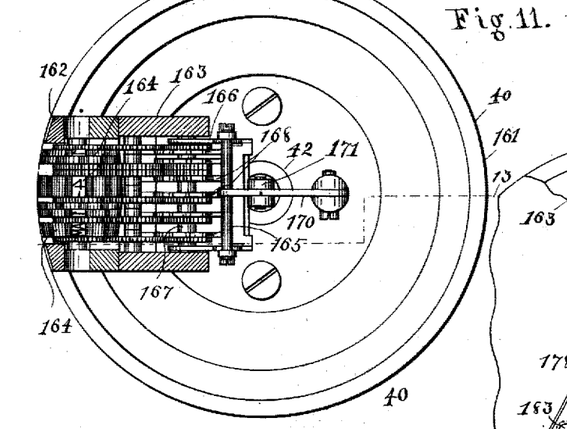
Fig. 11 is a plan view of the printing-roll, the cap being removed therefrom, while the sliding casing of the time-registering mechanism is sectioned to expose said mechanism.
Figure 12:
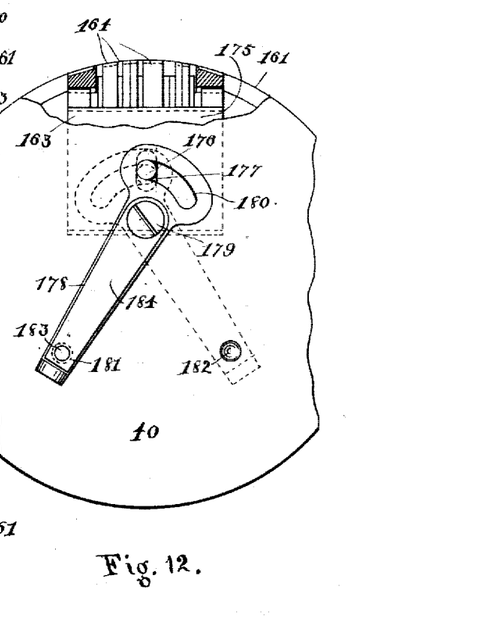
Fig. 12 is a plan view of said printing-roller, showing the cap and the lever for moving the printing mechanism to and from a printing position, a portion of the cap being broken away to show the printing mechanism.
Figure 13:
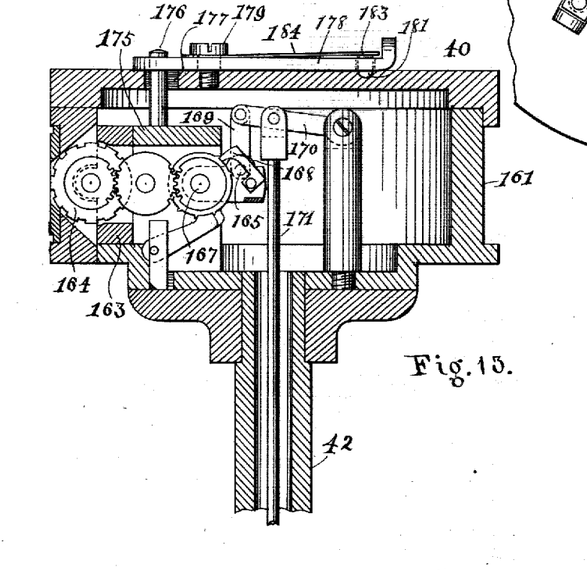
Fig. 13 is a vertical sectional view taken upon the line 13, Fig. 11, showing the time-operating mechanism and a portion of the hollow shaft upon which the printing-roll is mounted.

The printing-wheel (designated generally by 40) consists of a hollow cylindrical casing 161, Figs. 11 to 13, inclusive, mounted upon the upper end of the shaft 42. An opening is formed in the side of the casing, as shown at 162, Fig. 11, within which is inserted an oblong metal case 163, arranged to contain time-printing wheels, designated generally by 164, said wheels bearing the usual dating characters, and being, with their immediate actuating mechanism, in all respects like the well-known time-printing wheels, except that they are arranged severally with their axes at right angles to that of the printing-wheel 40, and the face or periphery of each wheel is rounded to conform to the curve of an arc of the periphery of said wheel in which they are contained. An important advantage of this construction is that any obstruction occurring to the passage of a letter would not tend to displace the wheels by rotation upon their axes, so as to cause the wrong numbers or characters to be presented, as is the case where the axes of the time-printing wheels are parallel to that of said main printing-wheel. As will be observed by reference to Figs. 11 and 12, this construction causes the relative diameter of the various time-printing wheels to vary.

A shaft 165, Figs. 11 and 13, has a yoke 166 mounted thereon, which is pivoted upon the shaft 167, upon which latter is mounted the usual series of gears and ratchet-wheels, as shown, for controlling the time-printing wheels. Said yoke is connected by means of a link 169, pivoted lever 170, rod 171, (see also Fig. 4,) lever 172, and rod 173 with the train of a clock 174. With each movement of the rod in the hollow shaft 42 pawls 168 upon said yoke serve to actuate the wheels and thereby to move the time-printing wheels. No claim is made herein for the mechanism employed for operating said time-printing wheels, that having been shown and described in my Letters Patent No. 615,031. The case 163, which serves as a frame for said time-printing wheels and their connecting mechanism, is made to move in a straight line within the cylindrical case 161 to and from the axis of the latter. This movement is to enable the printing-wheels to be withdrawn when desired and is accomplished in the following manner: Upon the top plate 175 of said case is placed a pin 176, which projects upwardly through a slot 177 of the top plate or cap of the main printing-wheel. A lever 178, pivoted at 179 upon said cap, is provided with a cam-shaped slot 180, Fig. 12, through which the pin 176 is projected. Indentations 181 182, formed in the top of said cap, are fitted to receive a slot-pin 183, attached to a flat spring 184 upon the top of said lever, said spring being held in place by the pivot-screw 179. The pin 183, which is rounded upon its lower end, projects through a bore in the end of said lever and serves to maintain said lever in one or the other of the two extreme positions shown in Fig. 12. The cam-shaped slot 180 serves when the lever is moved to push the pin 176, and thereby the case 163, into and out of a printing position, as indicated in dotted lines in Fig. 12.

Figure 14:
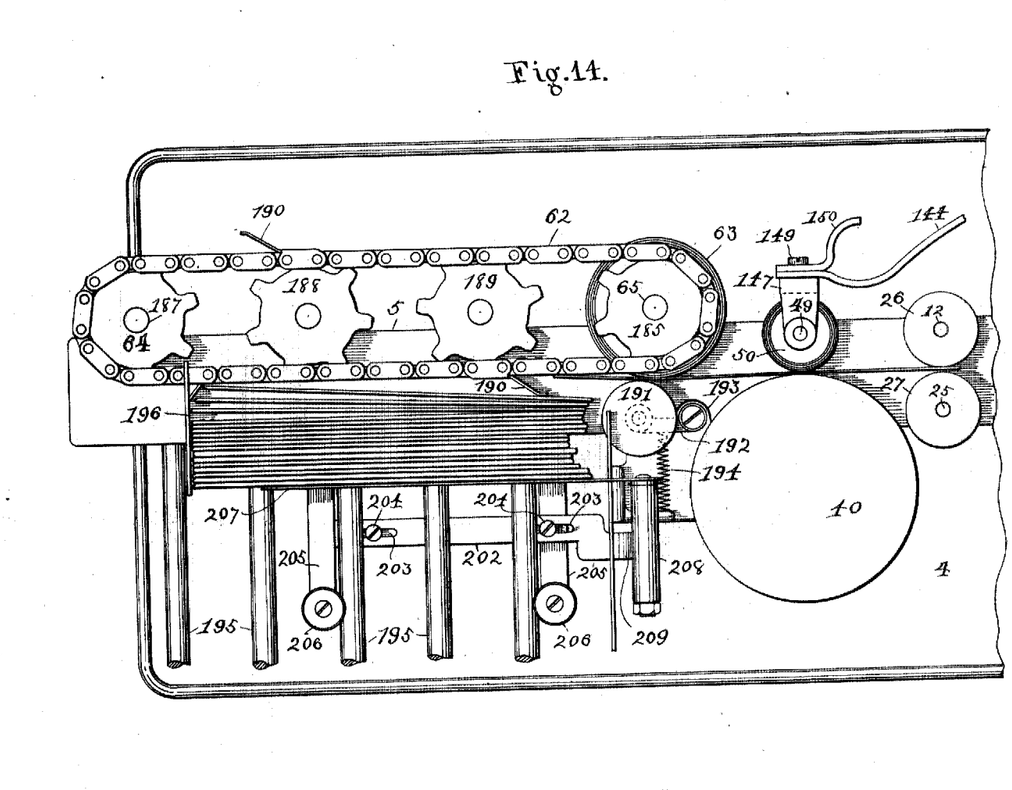
Fig. 14 is a plan view of a portion of the rear end of the machine, showing the stacking mechanism in connection with parts of the feed and printing mechanism.

After the letter or other article to be marked is printed it is passed to the stacking mechanism. (Shown in Figs. 1 to 5, inclusive, and 14.) Said stacking mechanism consists of a friction-wheel 63, mounted upon a shaft 65, hereinbefore referred to and likewise shown in Fig. 6, which acts in conjunction with a sprocket chain or belt 62, as may be preferred, mounted upon sprocket-wheels 185 186, Fig. 14, the former of which is keyed to the shaft 65, while the latter is loosely mounted upon a stud 187. Intervening sprocket-wheels 188 189, mounted upon like studs, serve to keep said chain in alinement without undue tension. Fenders 190, attached to said chain, serve to push each letter laterally as it reaches the end of its travel, thereby opening a path for the next succeeding letter. A compression-roller 191 is mounted upon an end of a swinging arm 192, pivoted to the frame at 193, and is controlled by means of a spring 194, which serves to press the roller 191 against the roller 63 to insure the passage of the letters to the stacking mechanism.

Figure 2:
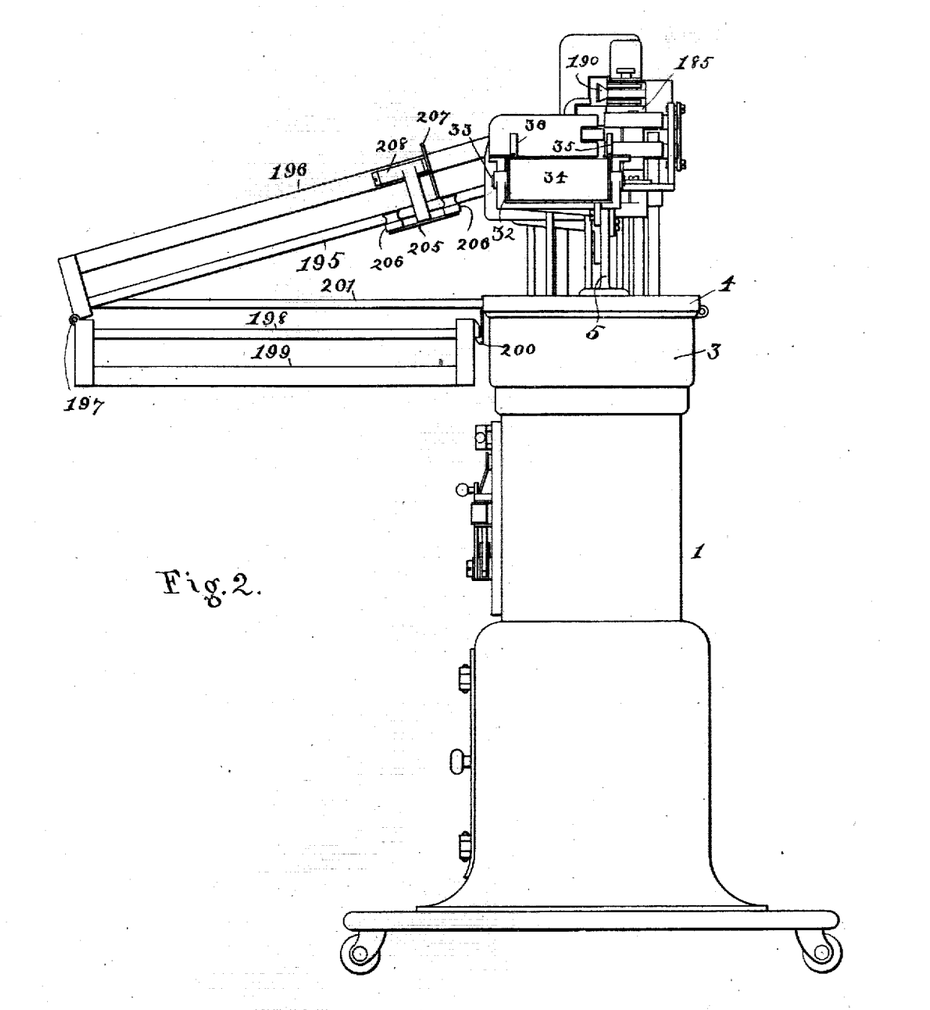
Fig. 2 is an end view thereof.

A frame is provided for the reception of the articles to be marked, which consists of a series of inclined rods 195, having their upper ends rigidly attached to the frame of the machine and a stop-bar 196, arranged above and parallel with the last of said frame-rods. Said rod-frame is made in two sections hinged together at 197, Fig. 2, the rod 198 and bar 199, which form extensions, respectively, of the bars 195 and bar 196, being arranged to fold beneath said last-named bars, as shown in Fig. 2, where they are supported by means of a catch 200. A brace-rod 201, projecting horizontally from the frame of the machine to the lower end of the bars 195, serves to support said bars. A traveling follower is provided for supporting and moving with the articles to be marked as the collection is increased. This consists of a horizontal bar 202, located beneath the bars 195 and provided with slots 203 therein, through which are inserted screws 204, which are tapped into cross-bars 205 205, having upwardly-projecting grooved rollers 206, which engage and roll upon the sides of two of the rods 195, as shown. The screws 204 are so adjusted as to cause the rollers to press against and to slightly bend the rods toward each other, thereby causing a slight but yielding frictional resistance to the movement of the carriage, the extent of which may be varied as desired by the extent of the compression. A follower-plate 207 is hinged at 208 to a bearing upon the end of an upwardly-bent arm 209, the plane of said follower-plate being at right angles to that of said bars 195. In operating said stacking device the follower-carriage is pushed upwardly to its full limit, and as the articles marked accumulate they press against the plate 207 and move it against the frictional action of the carriage. If more room is needed than is afforded by the bars 195, the extension may be swung outwardly and locked into place; but it has been found in practice that the follower-plate is only needed for a limited distance, and hence upon reaching the end of the rods 195 the plate is turned upon the hinge 208 and allowed to hang down out of the way.

Having thus described my invention, I claim—

1. In a machine of the class described, the combination with feeding-rolls and a revoluble printing-die, of a revoluble serrated synchronizing wheel located in the path of movement of the feed-rolls, and means timed to conform to the rotation of the printing-wheel for actuating said synchronizing wheel whereby the article to be marked may be timed to contact with the feed-rolls at a predetermined period of their rotation.

2. The combination with a revoluble printing-die and feed mechanism, of a toothed synchronizing wheel the teeth of which are located in the path of movement of the article to be marked, said wheel being rotated step by step in harmony with the rotation of the printing-die and means for deflecting the article to be marked against one of the teeth of said synchronizing wheel.

3. The combination with a revoluble printing-die and feed mechanism, of a synchronizing wheel located in the path of movement of the article to be marked, means for actuating said wheel step by step in harmony with the movement of the printing-die, said wheel being provided with a series of teeth, one face of each of which is tangential to a circle drawn from the center of said wheel, while the other coincides with a line radiating from said center, whereby said wheel may serve alternately to retard the article to be marked and then to move it into alinement with the feeding mechanism.

4. The combination with a primary or initial feeding mechanism adapted to permit the passage of but one article at a time to be marked, of a revoluble printing-die, a secondary pair of feed-rolls arranged to rotate in a fixed relation thereto, a synchronizing wheel located between said primary and secondary feed-rolls, said wheel having teeth arranged to extend successively into the plane of the meeting faces of said feed-rolls to engage and control the movement of the articles to be marked, and means for actuating said synchronizing wheel step by step in harmony with the rotation of said printing-die.

5. The combination with primary and secondary feed mechanism, of a revoluble printing-die arranged to rotate in harmony with said secondary feed mechanism, a synchronizing wheel located between said primary and secondary feed mechanism, said wheel having teeth arranged to extend successively into the direct path of movement of the articles to be marked, to engage and control the movement of said articles respectively and means for actuating said synchronizing wheel one step with each rotation of said printing-die.

6. The combination with primary and secondary feed mechanism, of a revoluble printing-die arranged to rotate in harmony with said secondary feed mechanism, a synchronizing wheel located between said primary and secondary feed mechanism, said wheel having teeth arranged to extend successively into the direct path of the articles to be marked to engage and control the movement of said articles respectively, means for actuating said synchronizing wheel one step with each rotation of said printing-die, and a spring-controlled deflecting-plate for deflecting said articles into contact with said synchronizing wheel.

7. The combination with a continuously-revoluble printing-die of two sets of coacting feed mechanism, one to initiate the movement of the articles to be marked, while the other is placed between it and the printing-die, the latter being timed to bear a fixed relation in its movement to the rotation of the printing-die, and an intervening synchronizing mechanism, also timed to conform to the rotation of said printing-die, for positively controlling and timing the introduction of the articles to be marked to the secondary feed mechanism.

8. The combination with a revoluble printing-die and two sets of feed-rolls, of a positively-actuated synchronizing device immediately preceding the second set of feed-rolls with a slight space between it and the meeting faces of said rolls, and means for causing the movement of said synchronizing device and said second set of feed-rolls to be timed to act in harmony with the rotation of said printing-die.

9. The combination with a revoluble printing-die and two sets of feed-rolls, of a toothed synchronizing wheel interposed between the first and second sets of feed-rolls, means for actuating said wheel one step with each rotation of the printing-die and means for automatically locking said wheel in a normal position.

10. The combination with a revoluble printing-die, of revoluble feed-rolls bearing a fixed relation thereto, a star-wheel in operative connection with a registering mechanism, a cam arranged to rotate at the same speed with said printing-die, said cam being in proximity to, but normally out of engagement with said star-wheel and means actuated by the passage of an article to be marked, for moving said cam into engagement with said star-wheel.

11. The combination with a revoluble printing-die, of a registering mechanism, a star-wheel normally at rest for actuating the same, a juxtaposed cam normally out of contact with said star-wheel, said cam being arranged to rotate at like speed with said printing-die, feed mechanism, and means operated by the passage of an article to be marked for bringing said cam into operative engagement with said star-wheel.

12. The combination with a revoluble printing-die, of a spring-actuated compression-roll in juxtaposition thereto, a revoluble cam timed with said printing-die, for acting upon said compression-roll, a spring-controlled catch for normally locking said compression-roll away from said printing-die, a star-wheel for withdrawing said catch and means operated by the passage of an article to be marked for moving said star-wheel one step with the passage of each article.

13. The combination with a revoluble printing-die, of a compression-roll, means for pressing the same against said die, means for consecutively withdrawing and permitting the release of said compression-roll with each revolution of said printing-die, supplemental means for normally locking said compression-roll away from said printing-die, mechanism actuated by the passage of an article to be marked for releasing said locking means, primary and auxiliary feed-rolls, means for rotating the latter in harmony with the rotation of the printing-die, and a synchronizing mechanism timed to act in harmony with the revolution of said printing-die for synchronously and positively controlling the introduction of the article to be marked to the auxiliary feed-rolls.

14. The combination with a revoluble printing-die, of a juxtaposed compression-roll, means for normally locking the same away from said die, feed-rolls, releasing mechanism controlled by the passage of an article to be marked, and a synchronizing mechanism for timing the introduction of the articles of varying length to said feed-rolls, said synchronizing mechanism being positively timed to act synchronously with the rotation of said printing-die to release the mail-piece by its own independent action.

15. In a machine of the class described, the combination with a revoluble cylindrical case of a sliding case fitted to move therein to and from the periphery thereof, time-printing wheels mounted in said sliding case, a pivoted eccentrically-slotted lever upon said cylindrical case, means for connecting said eccentric slot with said sliding case and a spring-controlled locking mechanism for locking said lever in one or another extreme position.

16. In a stacking mechanism, the combination with follower-supporting rods of a follower, a carriage therefor mounted upon said rods, means for producing friction to control the movement of said carriage, said follower being mounted upon said carriage by means of an arm hinged at one end, whereby said follower may be folded laterally and downwardly out of the way when not in use.

17. The combination in a stacking mechanism of follower-supporting rods, a follower, a carriage therefor, said carriage having grooved wheels for engaging opposite sides of two parallel rods, and means for adjusting said wheels to press against said rods from opposite directions, whereby a yielding pressure and a corresponding frictional action may be imparted to said wheels to resist the movement of the carriage to conform to the requirements of the stacking mechanism.

18. In a stacking mechanism, the combination of laterally-extended rods for receiving and supporting the articles marked, said rods being made in sections hinged to each other, one section of which is adapted to fold beneath the other when not in use.

In testimony whereof I have signed this specification, in the presence of two subscribing witnesses, this 25th day of August, 1903.

ERNST R. MALMBORG.

Witnesses:
D. H. FLETCHER,
CARRIE E. JORDAN.